Oct. 21, 1958     A. L. LEISER     2,857,036

PUSHER MECHANISM

Filed Sept. 12, 1955     3 Sheets-Sheet 1

INVENTOR:
ALFRED L. LEISER
by Andrus & Sceales
Attorneys

Oct. 21, 1958 A. L. LEISER 2,857,036
PUSHER MECHANISM
Filed Sept. 12, 1955 3 Sheets-Sheet 2

INVENTOR:
ALFRED L. LEISER
by Andrus & Sceales
Attorneys

Oct. 21, 1958 A. L. LEISER 2,857,036
PUSHER MECHANISM
Filed Sept. 12, 1955 3 Sheets-Sheet 3
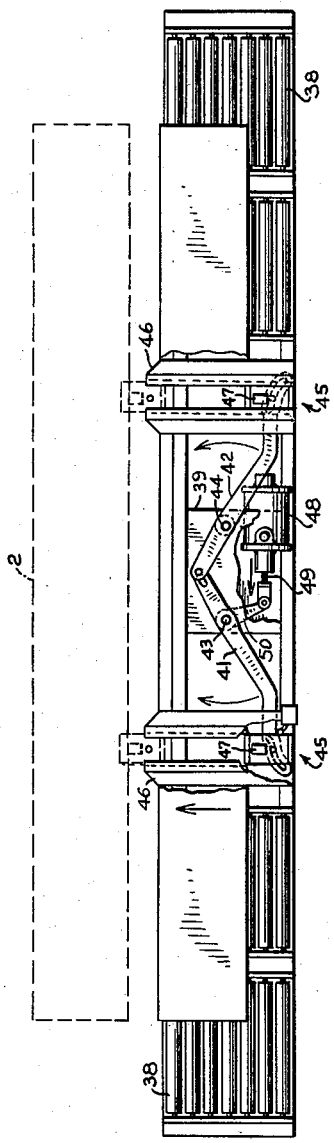
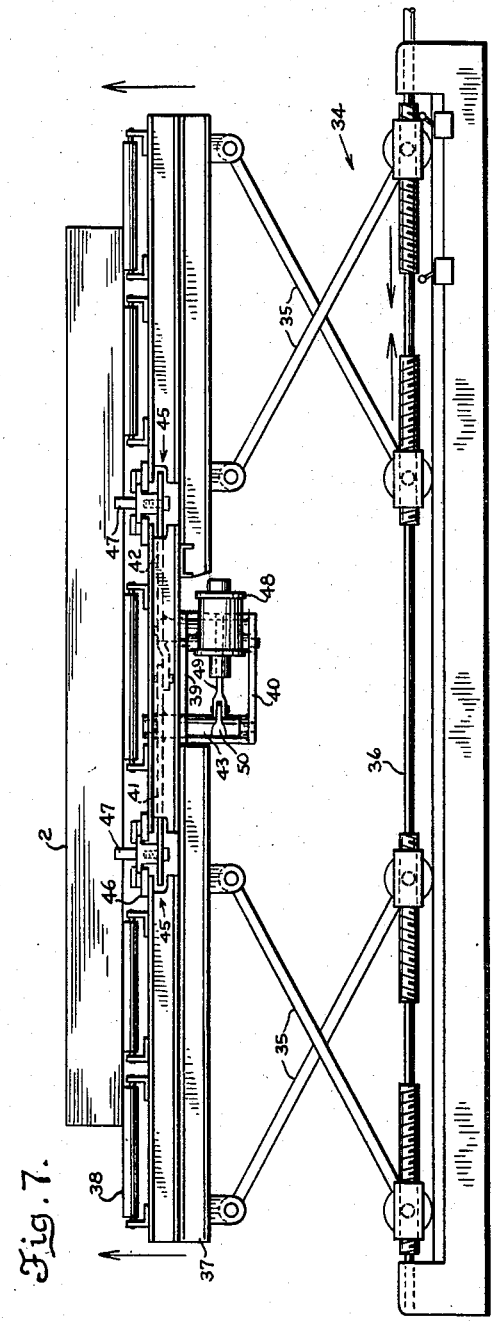
INVENTOR:
ALFRED L. LEISER
by Andrus & Sceales
Attorneys United States Patent Office
2,857,036
Patented Oct. 21, 1958

2,857,036
PUSHER MECHANISM

Alfred L. Leiser, Brookfield, Wis., assignor to A. O. Smith Corporation, Milwaukee, Wis., a corporation of New York Application September 12, 1955, Serial No. 533,670

3 Claims. (Cl. 198—24)

This invention relates to a pusher mechanism, and more particularly to an apparatus for pushing large stacks of vehicle frame components or the like from one conveyor or work station to another.

In the manufacture of vehicle frames, large metal sheets are first cleaned, followed by a slitting or shearing operation to obtain suitable strips for blanking. Subsequent to blanking, the components are punched, shaped and finally welded or riveted together to form the completed frame. In automatic or semi-automatic frame making plants, it is desirable to make a large number of each component and then transfer them to the proper stations for shaping, welding, etc. Since some stacks of components may weigh up to several tons, machinery must be devised to handle the stacks quickly and accurately so that the entire frame manufacturing process runs smoothly and efficiently.

Stacks of side rail blanks or the like are often transferred from one place to another over a series of rollers which allow easy horizontal movement in at least one direction. The rollers are sometimes provided with driving means to move the stacks. However, it is often desirable to provide other means for moving the stacks.

The present invention contemplates a novel stack pusher which is used to engage the side of a stack and push it along the transfer rollers, thereby eliminating the need for a direct drive of the rollers. The pusher is compact in construction and may operate to push the stacks varying distances on a transfer conveyor.

The accompanying drawings illustrate the best mode presently contemplated by the inventor for carrying out the invention.

In the drawings:

Fig. 6 is a top plan view of a second embodiment of the invention with parts broken away; and Fig. 7 is a side elevation of the pusher shown in Fig. 6.

Figure 1:
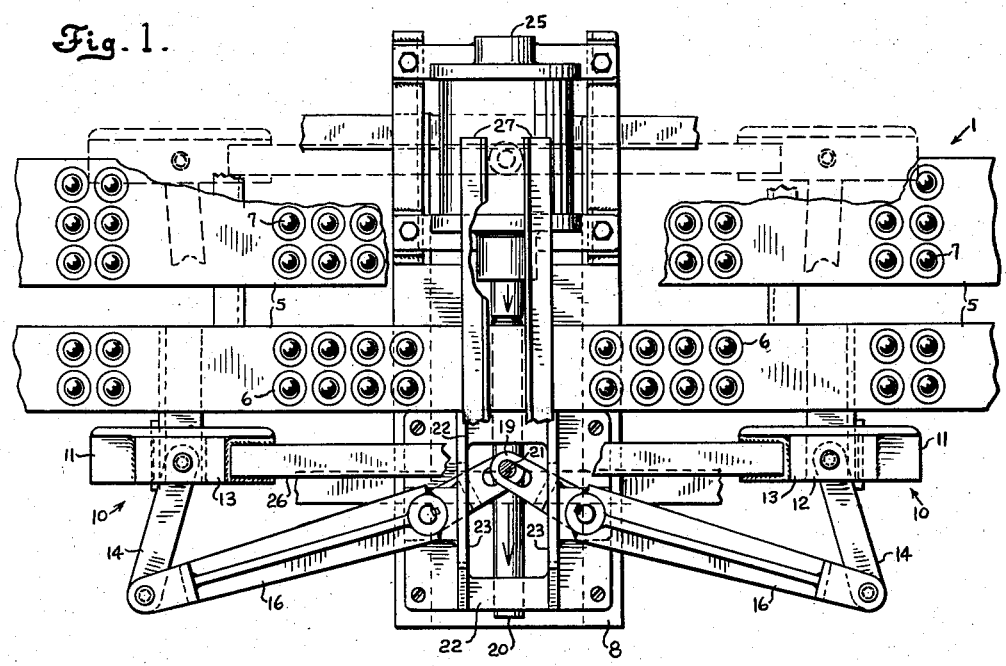
Figure 1 is a top plan view of a stack pusher constructed in accordance with the invention with parts broken away.
Figure 2:
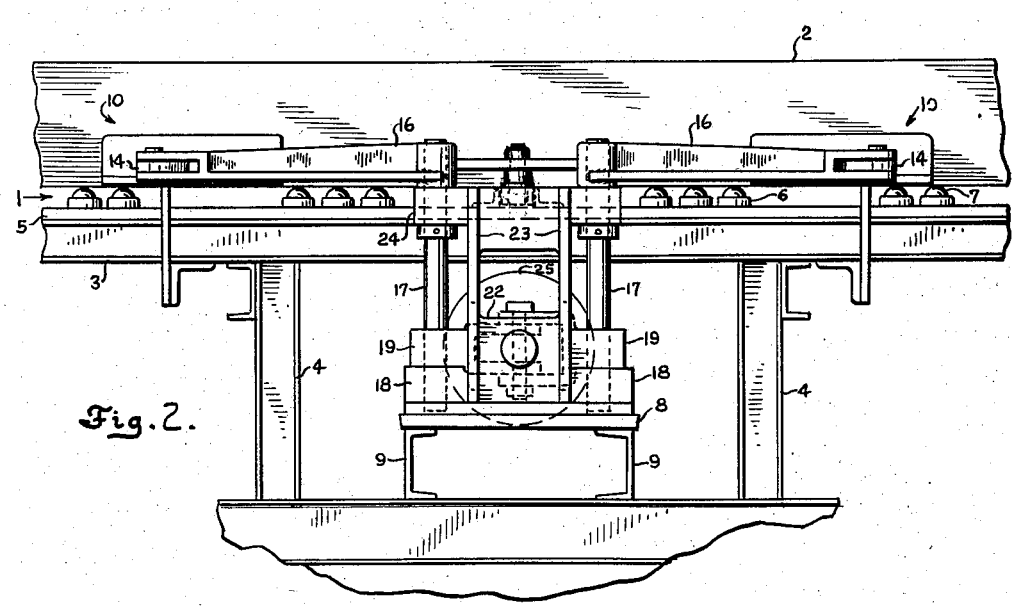
Fig. 2 is a side elevation of the stack pusher.

As shown in Figs. 1–5 of the drawings, the stack pusher is adapted to be disposed between suitable work stations (not shown) and adjacent a ball transfer unit 1 which is designed to support and transfer stacks of material 2 between the work stations. The work stations may be disposed so that a change of travel direction is necessary to transfer stacks 2 from one station to another. Ball transfer unit 1 is secured to a fixed frame 3 of suitable construction which is supported a substantial distance above the floor or foundation by suitable legs 4 and comprises a pair of longitudinally extending plates 5 having sockets 6 therein which are adapted to receive balls 7 which serve to support and transfer stacks 2.

The stack pusher is mounted on a plate 8 which is supported by a pair of spaced channel members 9 secured to the floor. Plate 8 extends a substantial distance under ball transfer unit 1 so that a large part of the pusher actuating mechanism is disposed out of the way.

Figure 3:
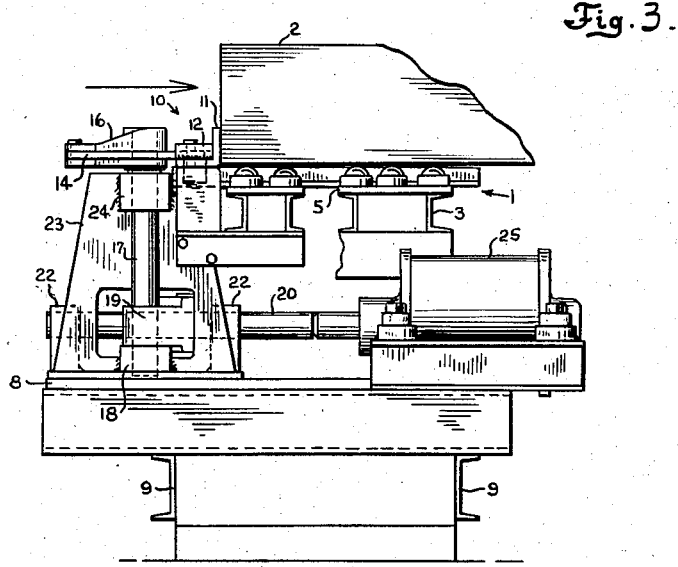
Fig. 3 is an end view taken from the right of Fig. 2 with parts omitted.
Figure 4:
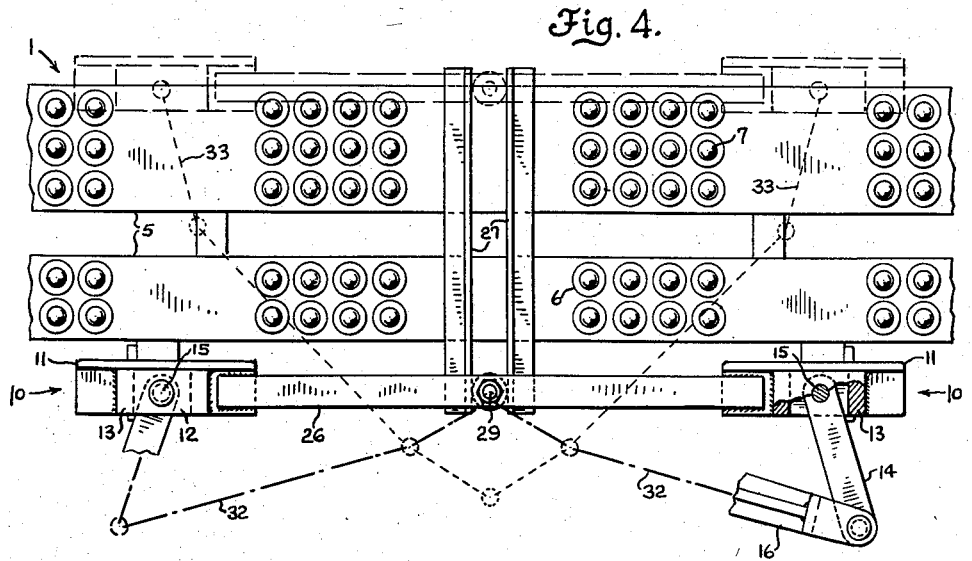
Fig. 4 is a detail plan view of the pusher and guide mechanism with a part broken away in section.

Stacks 2 are engaged and moved across transfer unit 1 by a pair of pusher heads 10 which are disposed adjacent unit 1 in a place thereabove. As best shown in Figs. 3 and 4, each head 10 comprises an angle iron member 11 having its upstanding flange disposed directly adjacent unit 1. A plate 12 is spaced above the horizontal flange of each angle iron 11 and has a pair of downwardly extending flanges 13 for securement to angle iron 11. Plate 12 is spaced sufficiently above angle iron 11 so that the outer end of a short link 14 may be received therebetween. Link 14 is pivotally secured to pusher head 10 by a vertical pin 15.

Pusher heads 10 are adapted to move across unit 1 and transversely thereof and thereby transfer stacks 2 onto a conveyor or the like. This is accomplished by a drive mechanism which comprises a long lever arm 16 pivotally secured at one end to the outer end of each link 14. The other end of each arm 16 is suitably keyed to the upper end of a vertical shaft 17, which is rotatably mounted in a bearing 18 secured to and disposed adjacent a longitudinal edge of plate 8.

Rotation of shafts 17 will pivot long lever arms 16 about the fixed vertical axes of shafts 17 and thereby carry pusher heads 10 across ball transfer unit 1. Shafts 17 are rotated by short lever arms 19 which are suitably keyed to the lower portions of shafts 17 and which converge inwardly between shafts 17. The inner ends of arms 19 are slotted and are mounted on a ram 20 by a pin 21 which passes downwardly through arms 19 and the ram.

The ram 20 extends centrally of support plate 8 and transverse to the longitudinal axis of ball transfer unit 1. The outer portion of ram 20 is guided and supported by a pair of spaced bearings 22 which are secured between the upstanding edges of a pair of spaced vertical plates 23 which are secured to plate 8 between ram 20 and shafts 17. Openings are provided in plates 23 so that lever arms 19 may pass therethrough.

Lower bearings 18 may be secured to plates 23 to provide stability for the plates. In addition, bearings 24 are secured to the upper portions of plates 23 and are adapted to receive the upper portions of shafts 17.

The inner end of ram 20 is received by a large cylinder 25 which is disposed beneath ball transfer unit 1 and secured to the inner end portion of plate 8. Cylinder 25 is provided with hydraulic or pneumatic fluid from a suitable source (not shown) and actuates ram 20 to pivot arms 19, thereby turning shafts 17 and moving pusher heads 10 across unit 1.

Pusher heads 10 are disposed on each side of plate 8 above unit 1 and must be kept in alignment transverse to the direction of pushing movement so that the pushing force applied to stacks 2 will be uniform. This alignment is accomplished by a tie bar 26 which extends between heads 10 and is secured thereto, as by welding.

Figure 5:
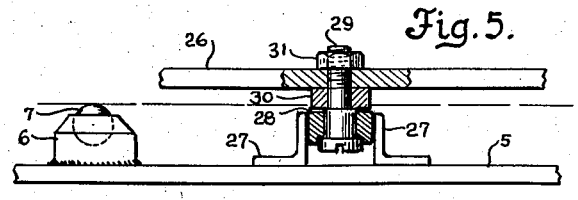
Fig. 5 is a fragmentary detail view of the pusher bar and guide, partly in section.

As seen in Fig. 5 a pair of spaced parallel angle iron guide members 27 are provided to keep tie bar 26 fixed as to direction so that heads 10 will move normal to the longitudinal axis of unit 1. Guide members 27 extend parallel to ram 20 and are secured to plates 5. A depending guide roller 28, secured to the tie bar 26, is disposed between the upstanding flanges of guides 27 and is adapted to ride longitudinally along the guides. A bolt 29 passes up through a spacer 30 and secures roller 28 to the tie bar 26. A lock nut 31 is threaded upon the end of each bolt 29 to tightly secure the bolt to the tie bar 26. Since pusher heads 10 are secured to tie bar 26, heads 10 will be kept in alignment transverse to the direction of the pushing movement at all times.

Operation of the stack pusher is as follows:

A stack 2 of frame components or the like is moved from a work station or the like onto ball transfer unit 1 for transfer to a second work station. The stack pusher actuating mechanism is disposed adjacent and beneath unit 1 with pusher heads 10 facing in a direction transverse to the original direction of movement of the stack. An initial position of the pusher is shown by heavy lines 32 in Fig. 4.

Ram 20 is then actuated within cylinder 25 pivoting the associated links and lever arms to engage heads 10 with stack 2 and push the stack across unit 1. The final position of the pusher is shown by dash lines 33 in Fig. 4. The pusher may then be returned to its initial position by reversing the action of cylinder 7.

Figs. 6 and 7 show another embodiment of the invention wherein the linkages are actuated in a slightly different manner and the pusher heads are replaced by upwardly extending dogs. In this embodiment, the pusher unit is adapted to be raised or lowered to accommodate variations in conveyor height or the like. Vertical movement is provided by a scissor-type lifter 34 secured to the floor and having upwardly extending arms 35 which are connected at their lower ends to a right and left-hand threaded shaft 36 and are pivotally secured at their upper ends to a frame 37 which carries longitudinally extending conveyor rollers 38 and the pusher unit.

A transversely extending horizontal support plate 39 is secured to the under side of frame 37. A second plate 40 is spaced beneath plate 39 and secured in any suitable manner. A pair of lever arms 41 and 42 are disposed above upper plate 39 and are secured together at their inner ends by a pin which passes through slots therein. Lever arms 41 and 42 diverge from their common pivot point and are suitably keyed inwardly of their longitudinal centers to the upper ends of vertical shafts 43 and 44 respectively which extend downwardly through plate 39 and are rotatably seated adjacent lower plate 40. In some instances it may be desirable to make arms 41 and 42 in more than one piece rather than using the single unitary members shown.

Arms 41 and 42 extend outwardly from shafts 43 and 44 and are connected adjacent their outer ends to pins which extend upwardly through the arms and through a slide member 45.

Each slide 45 is adapted to ride on transversely extending parallel guide plates 46 secured to frame 37 in any suitable way. Suitable pairs of gib bars and gib plates are disposed along the upper surfaces of plates 46 to keep slides 45 in proper alignment. An upwardly extending dog member 47 is secured to the upper surface of each slide 45 and acts as a pusher, the action of which will be described hereinafter.

The actuating mechanism for the apparatus comprises an air or other type cylinder 48 suitably secured between plates 39 and 40 and extending outwardly therefrom. The ram 49 of cylinder 48 extends inwardly beneath upper plate 39 and is pivotally attached to one end of a lever 50. The other end of lever 50 is keyed or otherwise secured to the lower portion of shaft 43.

Actuation of ram 49 pivots lever 50 and therefore shaft 43. Since arm 41 is keyed to the upper end of shaft 43, it will rotate with the turning of the shaft and thereby move slide 45 and dog 47 along one pair of guide plates 46. The inner end of arm 41 will be pivoted by shaft 43 and will carry with it the inner end of arm 42 which will pivot about the fixed vertical axis of shaft 44 and move the other slide 45 and dog 47 along their respective guide plates 41.

Slots are disposed adjacent the inner and outer pivoting portions of arms 41 and 42 so that the arms may move along a radius during operation of the machine. In addition, the head end of cylinder 48 is pivoted in any suitable manner to allow for radial movement of lever 50 on shaft 43.

Shafts 43 and 44 provide horizontally fixed vertical pivot axes as do shafts 17.

The pusher unit shown in Figs. 6 and 7 of the drawings may be positioned so that actuation of the mechanism will move dogs 47 against a stack of frame components or the like and push the stack along the conveyor.

The described distance of stack travel may readily be regulated by varying the speed of actuation of cylinders 25 or 48 to provide the proper impetus to pusher heads 10 or dogs 47. Any type of hydraulic or pneumatic fluid may be used in the cylinder and the fluid may be supplied through any suitable conduits and valves, not shown.

The invention provides a novel mechanism for transferring heavy material over a ball or roller-type transfer conveyor. The stack pusher is compact and comprises a minimum number of elements, thereby reducing maintenance and repair problems. Adjustment for distance of material travel may be easily and quickly accomplished.

Various modes of carrying out the invention are contemplated as within the scope of the following claims particularly pointing out and distinctly claiming the subject matter which is regarded as the invention.

I claim:

1. Apparatus for moving stacks of vehicle frame components or the like over a transfer unit, comprising a base, a pair of spaced shafts rotatably mounted on said base, a cylinder mounted on said base and having a ram extending outwardly from the cylinder and between said shafts, lever means pivotally mounted to each of said shafts and secured together at their inner ends on said ram, pusher heads pivotally connected to the outer ends of said lever means and being adapted to engage the stacks to move them along the transfer unit, and means to align said pusher heads transverse to their direction of movement to provide simultaneous contact of both pusher heads with the stack, said aligning means comprising a guide member disposed above said ram and generally parallel thereto, a guide roller disposed in said guide member and adapted to travel longitudinally therealong, a tie bar extending transversely of said guide member and fixedly secured at its center to said guide roller, and means to secure the outer ends of said tie bar to said pusher heads so that the heads are positioned in alignment transverse to said ram and guide member at all times, actuation of said ram outwardly from the cylinder serving to pivot said lever means about the fixed vertical axes of said shafts to push the pusher heads against the stack.

2. Apparatus for moving stacks of vehicle frame components or the like over a transfer unit comprising a base, a pair of spaced shafts rotatably mounted adjacent one end of said base and having fixed vertical axes, a fluid cylinder mounted on the other end of said base and having a ram slidable therein and extending outwardly from the cylinder and between said shafts, a first lever member fulcrumed to each of said shafts and having the inner end of each lever member connected to said ram, a link pivotally secured to the outer end of each lever member, a pusher head pivotally secured to each link, said pusher heads being adapted to engage the stacks to push the same along the transfer unit, and means to align said pusher heads transverse to their direction of movement to provide simultaneous contact of the pusher heads with the stack, said aligning means comprising a guide way disposed above said ram and generally parallel thereto, a guide associated with said guide way and adapted to travel longitudinally therealong, a tie bar extending transversely of said guide way and fixedly secured at its center to said guide, and means to secure the outer ends of said tie bar to said pusher heads so that the heads are positioned in alignment transverse to said ram and guide way at all times, movement of said ram outwardly from the cylinder serving to pivot the lever members about said shafts and pivot said links to move the pusher heads against the stack.

3. Apparatus for moving material over a transfer unit, comprising a base, a pair of spaced shafts rotatably mounted on said base, a cylinder mounted on said base and having a ram extending outwardly from the cylinder and between said shafts, lever means pivotally mounted to each of said shafts and secured together at their inner ends on said ram, pusher heads pivotally connected to the outer ends of said lever means and being adapted to engage the material to move the latter along the transfer unit, and means to align said pusher heads transverse to their direction of movement to provide simultaneous contact of both pusher heads with the material, said aligning means comprising a guide way disposed above said ram and generally parallel thereto, a guide associated with said guide way and adapted to travel longitudinally therealong, a tie bar extending transversely of said guide way and fixedly secured at its center to said guide, and means to secure the outer ends of said tie bar to said pusher heads so that the heads are positioned in alignment transverse to said ram and guide way at all times, actuation of said ram outwardly from the cylinder serving to pivot said lever means about the fixed vertical axes of said shafts to push the pusher heads against the material.

References Cited in the file of this patent

UNITED STATES PATENTS

| | | |
|---|---|---|
| 1,340,595 | Biggert | May 18, 1920 |
| 1,363,609 | McNaught | Dec. 28, 1920 |
| 1,431,895 | Purcell | Oct. 10, 1922 |
| 2,057,131 | Barton et al. | Oct. 13, 1936 |
| 2,234,990 | Todhunter | Mar. 18, 1941 |
| 2,234,991 | Todhunter | Mar. 18, 1941 |
| 2,426,569 | Stewart | Aug. 26, 1947 |
| 2,559,460 | Peterson | July 3, 1951 |
| 2,725,137 | Muddiman | Nov. 29, 1955 |

FOREIGN PATENTS

| | | |
|---|---|---|
| 384,797 | Germany | Nov. 9, 1923 |